Patented Nov. 30, 1943

2,335,538

UNITED STATES PATENT OFFICE 2,335,538

AZO PIGMENTS AND METHOD OF PRODUCING

William B. Reynolds, Cincinnati, Ohio, assignor to Interchemical Corporation, New York, N. Y., a corporation of Ohio No Drawing. Application November 14, 1942, Serial No. 465,630

2 Claims. (Cl. 260—150)

This invention relates to azo pigments, and has particular reference to new pigments, characterized by brilliance of tone combined with fastness to light and resistance to bleeding in organic solvents. Specifically, this invention relates to the coppery complexes obtainable from the couplings of beta-oxy naphthoic acid with diazotized primary aromatic mono-amines.

There has been considerable demand, particularly in the field of pigment printing on textiles, for pigments which would combine the features of brilliance of tone, fastness to light, and resistance to solvents such as acetone, while showing extremely good resistance to water and dilute soap solutions. In particular, acceptable browns and violets have been difficult to obtain unless insoluble vat dyestuffs are used.

In my copending application Serial Number 340,096, filed June 12, 1940, of which this is a continuation in part, I have disclosed the discovery of certain azo pigments which combine brilliance of tone, exceptionally good light fastness, and resistance to solvents with wash fastness. These pigments comprise the coppered complexes of the couplings of beta-oxy naphthoic acid with diazotized primary aromatic amines of the general formula $X_nR \cdot NH_2$, where R is a benzene or naphthalene nucleus, X is any substituent of the group consisting of alkyl, alkoxy, halogen and nitro, and $n$ is a number from 0 to 3. It is therein stated that aryl and aralkyl substituents may be employed, without any specific disclosure of compounds containing such groups.

This disclosure is directed to pigments which comprise the coppered complexes of the couplings of beta oxy naphthoic acid with diazotized amines of the general formula $X_nR \cdot NH_2$, where X is a substituent of the group consisting of alkyl and aralkyl, R is a benzene or naphthalene nuleuc, and $n$ is a number from 1 to 3.

These pigments range in color from deep violet to brown, and are particularly desirable as substitutes for the more expensive insoluble vat dyestuffs where pigment printing is being done.

These new pigments can be represented by the general formula:

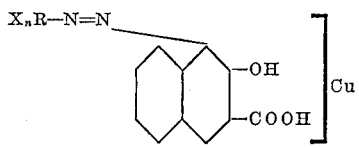

where R is a benzene or naphthalene nucleus, X is any substituent of the group consisting of aryl and aralkyl, and $n$ is a number from 0 to 3.

Typical amines which can be used include 2,amino biphenyl, 4-amino biphenyl, 4-amino-1,1'-binaphthyl, 4-phenyl-1-naphthylamine, 2,4-diphenyl aniline, 2,4,6-triphenyl aniline, p-benzyl aniline, p-amino bibenzyl, and 4-benzyl-1-naphthylamine, and certain other amines similar to the above but containing alkoxy, halogen, or nitro substituents in one or more of the aromatic nuclei.

Typical examples of my invention are the following:

16.9 grams (.1 M) ortho amino diphenyl was diazotized in the usual manner using .25 M hydrochloric acid, .1 M sodium nitrite and water. The resulting diazo solution was coupled to a solution made by dissolving 18.8 grams (.1 M) beta oxy naphthoic acid with 4 grams (.1 M) sodium hydroxide, 1500 cc. water and ice (total), 31.8 grams (.3 M) sodium carbonate (100%).

The red pigment was filtered, washed alkali free, reslurried with about 1500 cc. water, heated to 60° C. and treated with the following solution, also at 60° C.:

74.85 gms. (.3 M) copper sulfate (5 molecules water) dissolved in 200 cc. water, and the copper compound precipitated and redissolved with ammonium hydroxide. The mixture was then heated to and maintained near the boil for one hour, filtered and washed alkali-free.

The typical precautionary measures useful in diazotization reactions should be observed, these varying of course with the particular amine. In coupling, I prefer to operate with the beta oxy naphthoic acid partially out of solution, as I find that improved results are obtained in more concentrated coupling solutions.

The copper probably couples by forming a complex between the phenolic hydroxyl and the carboxyl group. I find that about 10 to 15% excess of copper is desirable over that necessary to produce the theoretical equi-molar complex with the beta-oxy naphthoic acid (i. e. one mol of copper per mol of dyestuff). The coppering can take place in neutral or alkaline solutions (pH 7.0 or higher), the copper may be present as a simple salt, or as a complex such as the copper ammonium complex. In general, rather elevated temperatures (60–100° C.) are necessary to insure complete coppering.

Obviously, many changes can be made in the specific examples, without departing from the scope of the invention, which is defined in the claims.

I claim:

1. As new pigment dyestuffs, the water-insoluble compounds of the general formula:

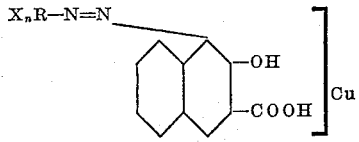

where R is a nucleus of the group consisting of benzene and naphthalene nuclei free of water-solubilizing substituents, X is a substituent of the group consisting of aryl and aralkyl, and $n$ is a number from 0 to 3.

2. The method of making a pigment dyestuff, which comprises diazotizing an amine of the formula:

$$X_n\text{—R—NH}_2$$

where R is a nucleus of the group consisting of benzene and naphthalene nuclei free of water-solubilizing substituents, X is a substituent of the group consisting of aryl and aralkyl, and $n$ is a number from 0 to 3, coupling the diazo compound with beta hydroxy naphthoic acid, and coppering in substance the azo compound so produced.

WILLIAM B. REYNOLDS.